W. T. LOWREY, Jr.
DEMOUNTABLE VEHICLE WHEEL RIM.
APPLICATION FILED NOV. 13, 1916.

1,250,909.

Patented Dec. 18, 1917.

Inventor
William T. Lowrey Jr.

By Beall & Fenwick
Attorneys

UNITED STATES PATENT OFFICE.

WILLIAM TYNDALE LOWREY, JR., OF BLUE MOUNTAIN, MISSISSIPPI.

DEMOUNTABLE VEHICLE-WHEEL RIM.

1,250,909.  Specification of Letters Patent.  Patented Dec. 18, 1917.

Application filed November 13, 1916. Serial No. 131,093.

*To all whom it may concern:*

Be it known that I, WILLIAM T. LOWREY, Jr., a citizen of the United States, residing at Blue Mountain, in the county of Tippah and State of Mississippi, have invented certain new and useful Improvements in Demountable Vehicle-Wheel Rims; and I do hereby declare the following to be a full, clear, and exact description of the invention, such as will enable others skilled in the art to which it appertains to make and use the same.

This invention relates to vehicle wheel structure, and more particularly to a demountable rim for vehicle wheels upon which there may be mounted and demounted as desired pneumatic or other cushion tires.

It is an object of the present invention to provide for the ready and easy mounting of a pneumatic or other tire upon the rim and to provide for the securing of the rim in tire-carrying position in a facile and secure manner.

A further object of the invention is to improve the construction of a demountable rim, whereby the rim may be easily applied to and removed from a wheel felly, and to provide for the secure locking of the rim to the felly in a manner which will not only maintain the rim in secure position on the felly but will also serve to reinforce the rim and operate to hold it from vibration and working loose when in use.

With the above and other objects in view as will be clear to those skilled in the art, the present invention comprises features having in view the accomplishment of these several objects, and in the accompanying drawing and following specification a preferred form of the invention is illustrated and described, in which drawings.

Figure 2:
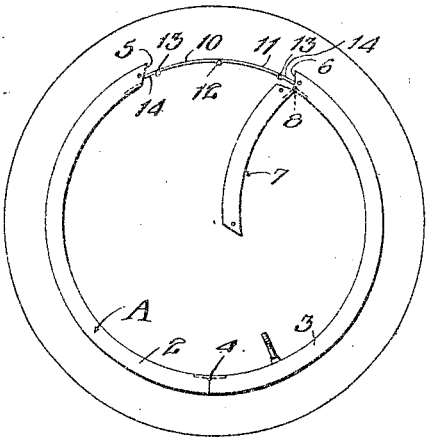
Fig. 2 is a side elevation of the rim and the tire thereon detached from the wheel, and showing a section of the rim as swung into position to permit the contraction of the remaining portion of the tire to permit and facilitate the removal of the tire.
Figure 3:
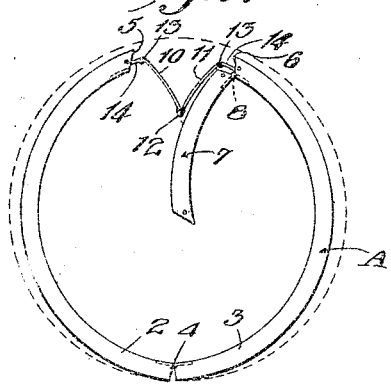
Fig. 3 is a side elevation showing the rim in contracted position with the operating links buckled to permit the inward swinging of the rim sections.

Ordinarily demountable rims are split and formed to be contracted to permit the mounting and demounting of a tire, and the purpose of the present invention is to facilitate the operation of mounting and demounting the tire, and to secure the members in expanded tire-carrying position, and in the present embodiment of the invention the rim A is disclosed as made of a series of sections, the main members 2 and 3 of which are hinged together at 4 preferably by a flush hinge arrangement keeping the interior surface of the rim, which latter is of the clencher or circumferentially flanged type, substantially flush. The upper or substantially diametrically opposite side of the rim A from the hinge point 4 is shown as split preferably at two places 5 and 6, Fig. 2, forming an intermediate articulated section 7 of the rim which may be hinged at one or the other of its ends as at 8 to the contiguous end of the section 3 of the rim and is adapted to be swung on its pivot 8 from a closed position in abutment at the split end 5 to an open position in Fig. 2. The adjacent and free ends of the rim sections 2 and 3 are constantly connected by a link structure which is adapted to be drawn inwardly toward the center of the wheel, Fig. 3, so as to accomplish the relative contraction or inward drawing movement of the upper ends 5 and 6 of the rim sections 2 and 3 after the rim has been detached from the wheel B.

Figure 6:
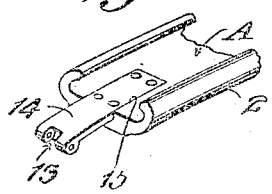
Fig. 6 is a perspective view of a fragment of one end of a rim section showing a hinge leaf rigidly secured thereto.
Figure 7:
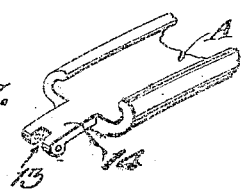
Fig. 7 is a perspective view of an end of a rim section in which the pintle bearing of the hinge is formed integral with the rim structure.

While the connection between the upper ends 5 and 6 may be of any suitable type capable of being drawn inwardly to thus flex the wheel rim, a preferred form of this flexible connection is shown as comprising a pair of links 10 and 11 hingedly jointed as at 12 at their adjacent ends, and each at its outer end hingedly or pivotally jointed as at 13 to the respective upper ends 5 and 6 of the rim sections 2 and 3. It is obvious that the link members 10 and 11 may be pivoted by pintles to integral portions of the rim sections as shown in Fig. 7, or the hinge pivots 13 may be attached to supplemental leaves 14 which may be riveted or otherwise rigidly secured in recessed portions of the adjacent ends of the rim sections 2 or 3, as at 15 in Fig. 6. It is desirable that the outer circumferential surface of the rim structure be formed of a substantially continuous unbroken circular surface, and in a similar manner the inner surface of the rim 9 is preferably to be formed of a continuous unbroken circle with the object in view of avoiding the cutting or mutilating of the perimeter of the felly, and to provide a smooth and continuous surface for the tread portion of the flanges of the applied tire.

Figure 1:
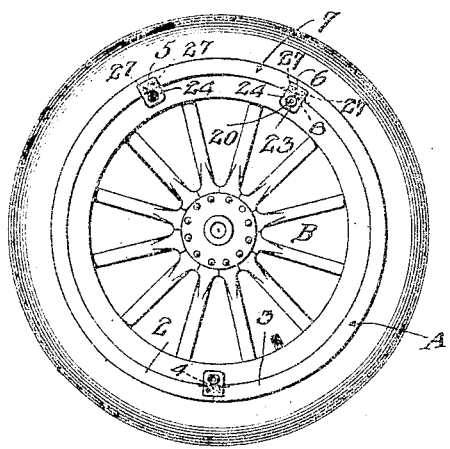
Figure 1 is a side elevation of a tire and the improved tire rim as mounted upon a wheel.
Figure 4:
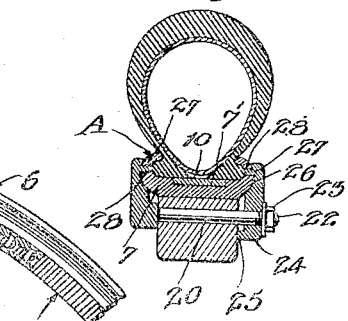
Fig. 4 is a transverse section through a portion of the wheel felly rim and mounted tire showing in detail the rim locking feature.
Figure 5:
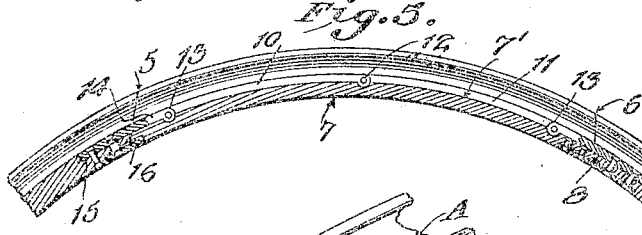
Fig. 5 is an enlarged detail circumferential section through the rim structure showing the parts in the expanded or tire-carrying position.

In the accomplishment of this feature the swinging member 7, which constitutes substantially a lock which when thrown outwardly into the position indicated in Fig. 1 serves to support the outwardly buckled toggle-like links 10 and 11 which will seat, to be substantially flush with the outer surface of the member 7 in a circumferential recess or groove 7', Figs. 4 and 5, formed in the outer surface of the locking section 7. This section 7 is connected at the hinge 8 to the complementary end of the rim section 3 by a flush hinge structure, and at its opposite end is designed to be latched in its closed position, Fig. 5, by a suitable means to hold it until it has been assembled or placed upon the felly of the wheel B.

A simple form of latch is shown in Fig. 5 as consisting of a bolt 16 which may be pivotally mounted on one of the rivets which fasten a hinge leaf 14 to the contiguous end 5 of the rim section. This latch is adapted to be turned from a releasing position which will allow the locking section 7 to be swung inwardly and later to be turned to a locking position over the swinging end of this section when the latter has been swung to the position indicated in Fig. 5 to lock the operating links 10 and 11 in their expanded position.

The operation of the device is substantially as follows: The detached rim in collapsed position is adapted to receive a deflated tire and the rim is then expanded to carrying-position by forcing the operating toggle links 10 and 11 outwardly to the position shown in Fig. 2 after which the locking section 7 may be swung upwardly to closed position and latched. The expanded rim and its tire may then readily be slipped onto the felly of the wheel B, as shown in Fig. 1, after which the rim is securely held against transverse shifting on the wheel felly by any suitable means.

One of the features of the present invention is to provide means which will not only secure the wheel against transverse shifting, but will lock it against circumferential movement, and particularly fasten the sections of the rim at those points where it is split or bifurcated, and securely hold these in assembled position as well as to prevent lost play or vibration. A simple form of this locking or securing means is illustrated in Fig. 4 in which a bolt 20 passes transversely through the felly of the wheel and may have an upwardly extending bracket or supporting portion 21 against which the rim A may be forced as it is applied to the felly of a wheel. The opposite end of the bolt 20 is threaded as at 22 to receive a nut 23 which is adapted to be jammed up against a clamp or clamp-like jaw 24 having a fulcrum edge 25 at one end and a seat portion 26 at its opposite end, between which two portions the bolt 20 passes. By applying the nut 23 and drawing the clamp member 24 tightly against the outer edge of the applied rim A, the latter is firmly secured between the opposing seat portions 21 and 26 and held against lateral shifting. The seat portions referred to may be concave as shown to provide against outward movement of the rim, and are preferably provided each with a pin or pins 27 adapted to enter complementary perforations 28 formed in the ends 5 and 6 of the sections 2 and 3 and in the ends of the sections 7. Thus when the rim has been expanded into tire-locking position, as in Figs. 1 and 4, and the clamp device 24 drawn tightly against the surface of the rim, the pins 27 engage the apertures and form a secure lock at the split portions 5 and 6 of the rim.

An advantage gained by the connection of the toggle links 10 and 11 to the ends 5 and 6 of the sections 2 and 3 in the manner shown and described and by hinging the locking section 7 interiorly of the rim as to these toggle links, is that the longer section 7 may be used as an operating lever when swung against the contracted toggle links 10 and 11 to force these outwardly and thus expand the contracted rim sections of the rim. This is of importance as the hinge point 12 passes the center between the hinges 13—13 when considerable pressure is necessary to secure the expansion of the rim sections within the tire. Flexure of the parts 10 and 11 and a sufficient amount of play in their pivotal joints permits the passing of the hinge 12 past the center just referred to.

What is claimed as new is:

1. A divided demountable wheel-rim having a flexible device consisting of connected links for contracting the ends at the division, and an independent hinged section of rim underlying said device.

2. A contractible, demountable wheel-rim comprising a rim structure having an inwardly swinging section, and a pair of connected links connected at each end of the pair to the rim-ends adjacent said section.

3. A contractible, demountable wheel-rim divided to form movable ends, means connected to said ends for moving them toward or from each other, and an articulated rim-section for filling the division between said ends and adapted to move said means to outward position and separate the rim-ends.

4. A demountable rim divided to form spaced ends, connected links pivotally attached to said ends and forming a portion of the tire receiving area of the rim, the rim having an articulated section channeled to receive the links.

5. A demountable rim divided to form spaced ends, connected links bowed to complete the circle of the rim face pivotally attached to said ends, the rim having an articulated section channeled to receive the links, said section underlying the links and completing the rim between the spaced ends.

In testimony whereof I affix my signature.

WILLIAM TYNDALE LOWREY, Jr.